United States Patent [19]

Koelpin

[11] Patent Number: 4,959,747

[45] Date of Patent: Sep. 25, 1990

[54] CIRCUIT ARRANGEMENT FOR CURRENT LIMITING

[75] Inventor: Thomas Koelpin, Amberg, Fed. Rep. of Germany

[73] Assignee: Siemens Aktiengesellschaft, Berlin and Munich, Fed. Rep. of Germany

[21] Appl. No.: 845,907

[22] Filed: Mar. 28, 1986

[51] Int. Cl.$^5$ .............................................. H02H 7/08
[52] U.S. Cl. ...................................... 361/31; 361/87; 323/901; 323/238
[58] Field of Search .................... 361/87, 95, 88, 29, 361/31; 323/901, 238

[56] References Cited

U.S. PATENT DOCUMENTS 3,959,704  5/1976  McCrea ................................ 318/387

FOREIGN PATENT DOCUMENTS 1117707  11/1961  Fed. Rep. of Germany.
5629478   8/1981  Japan.

OTHER PUBLICATIONS

British Publication, 3MC Module, Digital Three-Phase Induction Motor Controller, by Fairford Electronics, Ltd., 1984.
IEEE Transactions on Industrial Applications, Jan.-/Feb. 1984; Reduced-Voltage Starting of Squirrel-Cage Induction Motors, by Frank Bruce et al.

Primary Examiner—Todd E. Deboer
Attorney, Agent, or Firm—Eugene S. Indyk

[57] ABSTRACT

This invention concerns a circuit arrangement for current limiting for a.c. machines with phase gating control by solid-state devices, aimed at achieving a smooth start by arresting the steady decrease in the ignition angles upon the attainment of a predetermined limiting current value. For use with single-phase measurement of the load current, a circuit is provided for measuring the instantaneous value of the magnitude of the load current, such as a threshold-value detector, which is actuated by a single-phase full-wave rectified load current. The output of this threshold-value detector is applied to a monostable digital device.

4 Claims, 1 Drawing Sheet

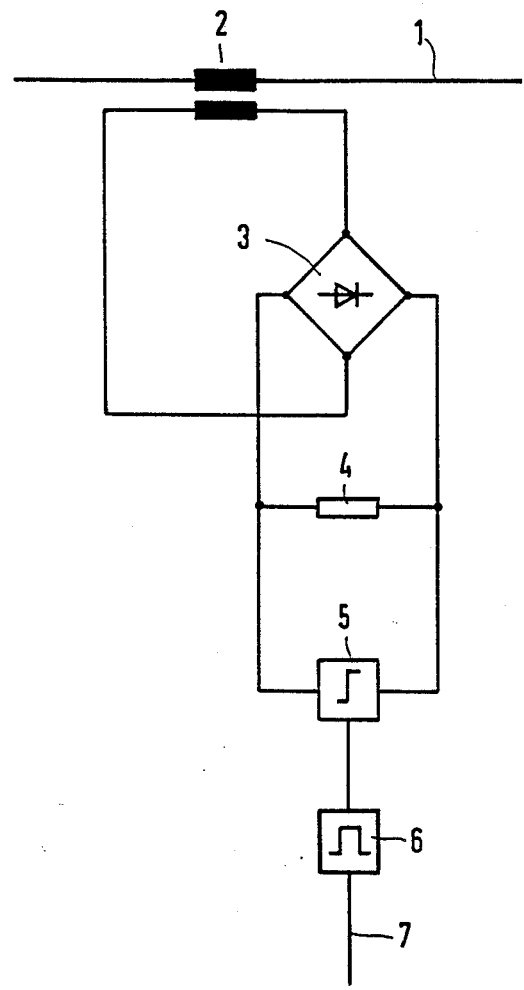

CIRCUIT ARRANGEMENT FOR CURRENT LIMITING

FIELD OF THE INVENTION

This invention relates to a circuit arrangement for the current limiting of a.c. machines to provide a smooth start through phase gating control by solid-state devices such as thyristors.

BACKGROUND OF THE INVENTION

Smooth starting is achieved by arresting the steady decrease in the ignition angle of the current control elements upon attaining a predetermined limiting current value. It is common practice in circuit arrangements arresting the steady decrease of the ignition angle of the current control elements, as shown in Fairford Electronics Ltd., Great Britain, Application Note 1984, for the so-called voltage ramp, to be arrested upon the occurrence of the limiting current value until the current being carried has decreased again as a result of a further acceleration of the machine. Current limiting of this type is possible in three-phase systems through evaluation of the variation of the three-phase full-wave rectified current patterns. In the three-phase case the contradictory requirements on the one hand, that the instantaneous current value must be determined in a very short time; and on the other, that in order to achieve the desired reduction in current, the control signal must be kept sufficiently long because of the discontinuous firing of the solid-state power devices, can be satisfied. However the hardware to implement this known procedure is expensive. In the case of single-phase application or measurement, for a three-phase motor, the hardware is less expensive; however the selection of a suitable smoothing time constant is critical to proper operation.

SUMMARY OF THE INVENTION

It is an object of this invention to create a circuit arrangement that achieves as good a current limiting as the ones that evaluate the three-phase full wave current patterns, in a single-phase measurement arrangement and avoiding the substantial expense. It is a further object to do so without the need for critical smoothing time constants.

Briefly stated in accordance with one aspect of the invention, the aforementioned objects are achieved by providing a circuit arrangement for current limiting in a.c. machines with phase gating current control by solid-state devices, for a smooth starting of the machine by arresting a steady decrease in the ignition angles of the solid-state devices upon the occurrence of a predetermined limiting current value. The circuit arrangement includes one-phase load current measurement means for measuring an instantaneous limiting value of the magnitude of the load current, and a means for providing a control signal to the solid-states devices.

It has turned out to be advantageous if the first means consists of a threshold-value detector and the latter means consist of a retriggerable, monostable element, also called a monoflop. Such threshold-value detectors and monostable elements are known from Tietze and Schenk. "Halbleiter-Schaltungstechnik", Berlin Heidelberg and New York, 3rd Edition, 1974, at pages 296 and 305. If the cycle time of the monoflop is longer than a half-cycle period of the line voltage, then it is insured that the decrease in the ignition angle is arrested until the load current has declined to the point that its value as a function of time always lies below the limiting value that was set.

BRIEF DESCRIPTION OF THE DRAWING

While the specification concludes with claims particularly pointing out and distinctly claiming the subject matter which is regarded as the invention it is believed that the invention will be better understood from the following description of the preferred embodiment taken in conjunction with the accompanying drawing in which the figure is a schematic block diagram of the circuit arrangement.

DESCRIPTION OF A PREFERRED EMBODIMENT

The current flowing in the line 1 to the a.c. load is detected by current transformer 2, rectified by a rectifier 3, and supplied to a load 4. Illustrated here is single-phase full-wave rectification. The threshold-value detector 5 is adjustable and measures the instantaneous value of the magnitude of the load current flowing in the line 1. The signal determined by the threshold-value detector is sent to the retriggerable monoflop 6. The execution time of this monoflop is longer than a half-cycle time of the line voltage. The signal on line 7 derivable herefrom can be used as a limiting-current signal or can be used directly to arrest the decrease of the ignition angle of the solid-state power devices. The solid-state power devices are not shown; however, they are known from the aforementioned Fairford Electronics, Ltd. application note.

It will now be understood that there has been disclosed an improved system for providing a current limiting gating signal to current control solid state devices. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

I claim:
1. In a.c. machines having phase gating current control by solid state devices in which a smooth start of the a.c. machine is provided by arresting a steady decrease in the ignition angle of the solid state devices upon the occurrence of a predetermined limiting current value, an improved current limiting circuit comprising:
   one phase load current measurement means including a circuit measuring an instantaneous limiting value of the magnitude of the load current and having an output signal; and
   means responsive to said output signal including a circuit providing a control signal to said solid state devices to arrest the decrease of the ignition angle of said solid state devices, wherein the means providing the control signal comprises a retriggerable monostable element.
2. An improved current limiting circuit in accordance with claim 1, wherein the load current measurement means comprises a threshold-value detector.
3. An improved current limiting circuit in accordance with claim 2, wherein a cycle period of the monostable element is longer than a half-wave period of the a.c. line voltage.
4. An improved current limiting circuit in accordance with claim 1, wherein a cycle period of the monostable element is longer than a half-wave period of the a.c. line voltage.

* * * * *